US010444803B2

(12) United States Patent
Aono

(10) Patent No.: US 10,444,803 B2
(45) Date of Patent: Oct. 15, 2019

(54) ELECTRONIC DEVICE

(71) Applicant: KYOCERA Corporation, Kyoto (JP)

(72) Inventor: Tomotake Aono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/033,014

(22) PCT Filed: Nov. 27, 2014

(86) PCT No.: PCT/JP2014/005947
§ 371 (c)(1),
(2) Date: Apr. 28, 2016

(87) PCT Pub. No.: WO2015/079701
PCT Pub. Date: Jun. 4, 2015

(65) Prior Publication Data
US 2016/0246336 A1  Aug. 25, 2016

(30) Foreign Application Priority Data
Nov. 28, 2013 (JP) .................. 2013-246403

(51) Int. Cl.
G06F 1/16 (2006.01)
G06F 3/0488 (2013.01)
(Continued)

(52) U.S. Cl.
CPC ............ *G06F 1/1692* (2013.01); *G06F 1/169* (2013.01); *G06F 1/1626* (2013.01); *G06F 3/038* (2013.01);
(Continued)

(58) Field of Classification Search
CPC .... G06F 3/0488; G06F 3/0414; G06F 3/0416; G06F 3/04883; G06F 3/038;
(Continued)

(56) References Cited

U.S. PATENT DOCUMENTS 8,712,478 B2    4/2014  Inami
8,830,184 B2    9/2014  Ono
(Continued)

FOREIGN PATENT DOCUMENTS

EP    2341418 A1      7/2011
JP    2003-316518 A  11/2003
(Continued)

OTHER PUBLICATIONS

International Search Report issued in PCT/JP2014/005947; dated Dec. 22, 2014.
(Continued)

*Primary Examiner* — Christopher E Leiby
(74) *Attorney, Agent, or Firm* — Studebaker & Brackett PC

(57) ABSTRACT

Operability is improved when operating an electronic device with one hand. An electronic device (1) includes a touch sensor on the front surface, a touch sensor on the back surface, and a controller that sets a reference point for screen processing upon detecting an operation on the touch sensor (13) on the back surface and executes screen processing based on the reference point and on input to the touch sensor (12) on the front surface.

4 Claims, 10 Drawing Sheets

(51) Int. Cl.
*G06F 3/041* (2006.01)
*G06F 3/0484* (2013.01)
*G06F 3/038* (2013.01)

(52) U.S. Cl.
CPC .......... *G06F 3/0414* (2013.01); *G06F 3/0416* (2013.01); *G06F 3/0488* (2013.01); *G06F 3/04845* (2013.01); *G06F 3/04883* (2013.01); *G06F 2203/0382* (2013.01); *G06F 2203/04806* (2013.01)

(58) Field of Classification Search
CPC .... G06F 3/04845; G06F 1/1692; G06F 1/169; G06F 1/1626; G06F 2203/0382; G06F 2203/04806
See application file for complete search history.

(56) References Cited

U.S. PATENT DOCUMENTS

| | | |
|---|---|---|
| 9,092,058 B2 | 7/2015 | Kasahara et al. |
| 2003/0189552 A1 | 10/2003 | Chuang et al. |
| 2011/0074716 A1 | 3/2011 | Ono |
| 2011/0128241 A1 | 6/2011 | Kang et al. |
| 2011/0242029 A1 | 10/2011 | Kasahara et al. |
| 2012/0062564 A1 | 3/2012 | Miyashita et al. |
| 2012/0276958 A1 | 11/2012 | Inami |
| 2012/0293456 A1* | 11/2012 | Ikeda ................ G06F 1/1626 345/174 |
| 2013/0069883 A1* | 3/2013 | Oga .................. G06F 1/1615 345/172 |
| 2016/0188181 A1* | 6/2016 | Smith ................ G06F 3/048 715/765 |

FOREIGN PATENT DOCUMENTS

| | | |
|---|---|---|
| JP | 2011-076233 A | 4/2011 |
| JP | 2011-221640 A | 11/2011 |
| JP | 2012-059291 A | 3/2012 |
| JP | 2012-084137 A | 4/2012 |
| JP | 2012-230567 A | 11/2012 |

OTHER PUBLICATIONS

Written Opinion issued in PCT/JP2014/005947; dated Dec. 22, 2014; with English language Concise Explanation.

An Office Action mailed by the Japanese Patent Office dated Nov. 7, 2017, which corresponds to Japanese Patent Application No. 2013-246403 and is related to U.S. Appl. No. 15/033,014; with English Concise Explanation.

\* cited by examiner

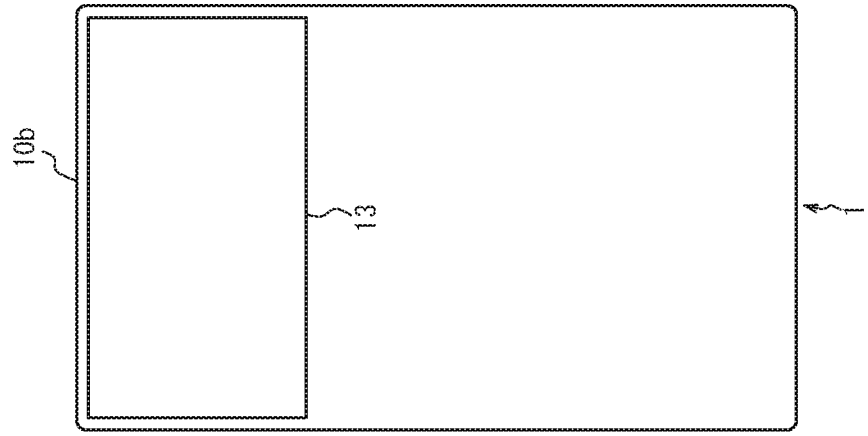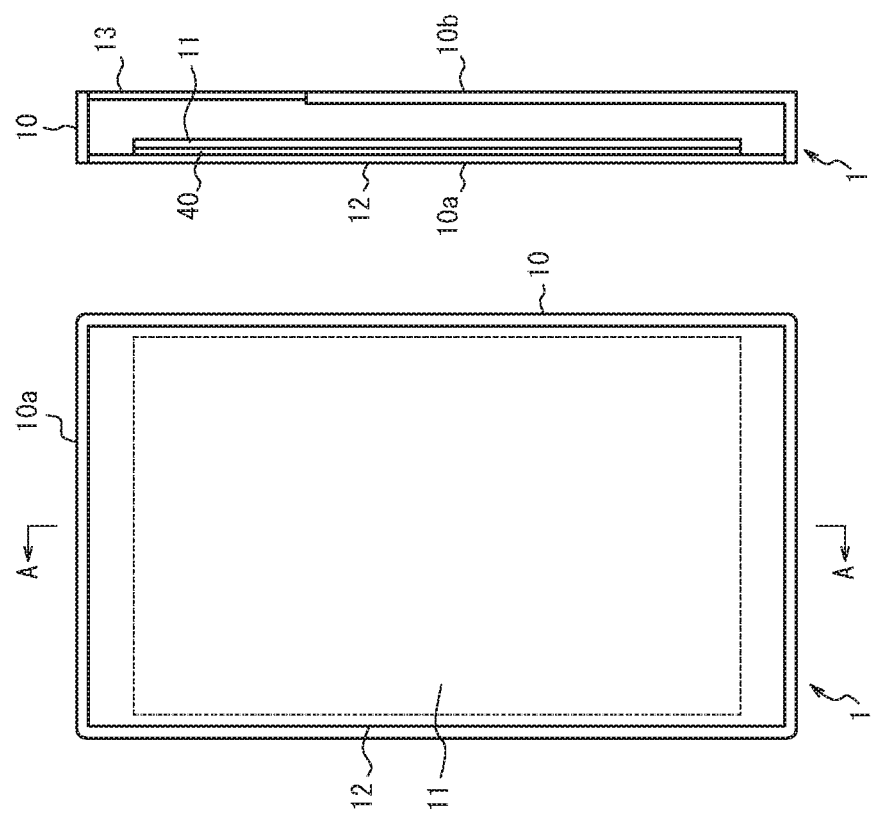

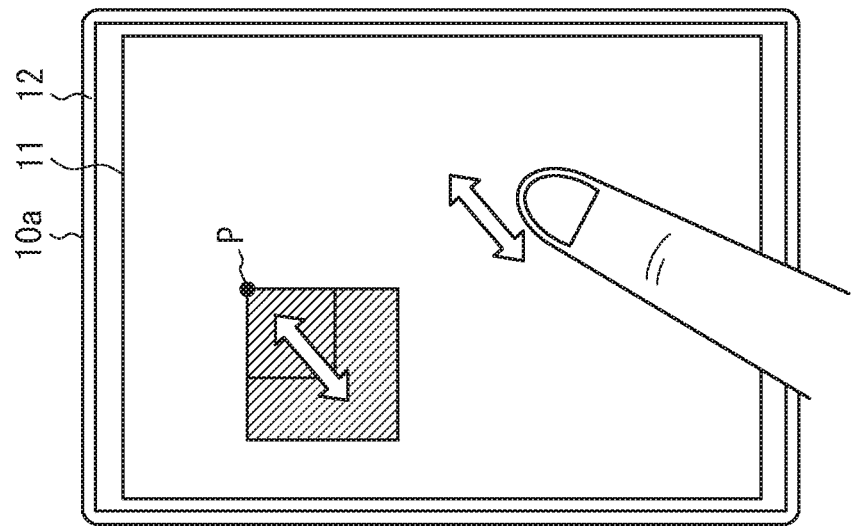
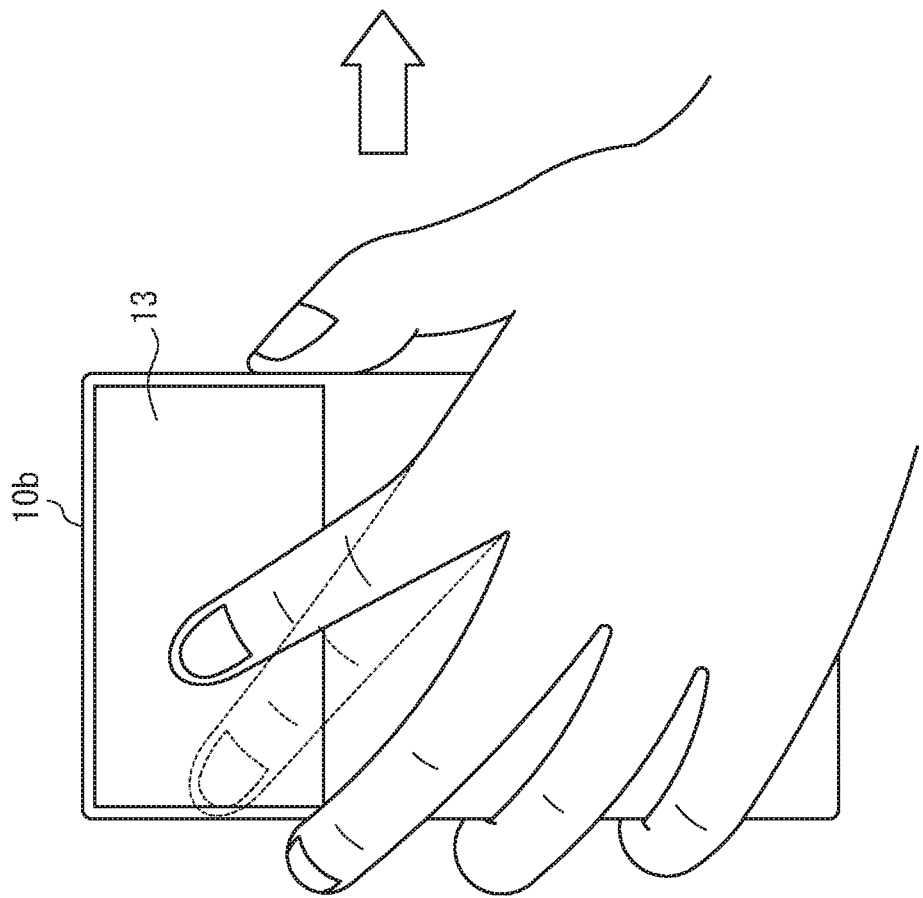

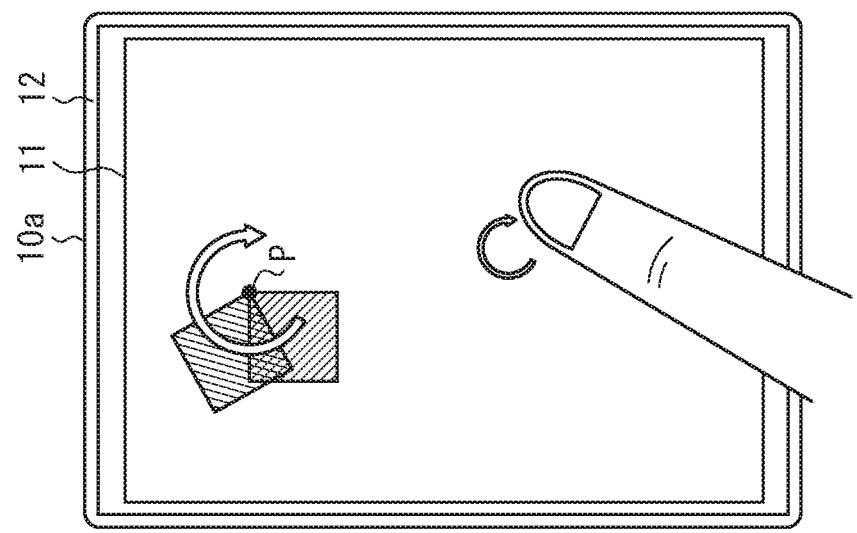
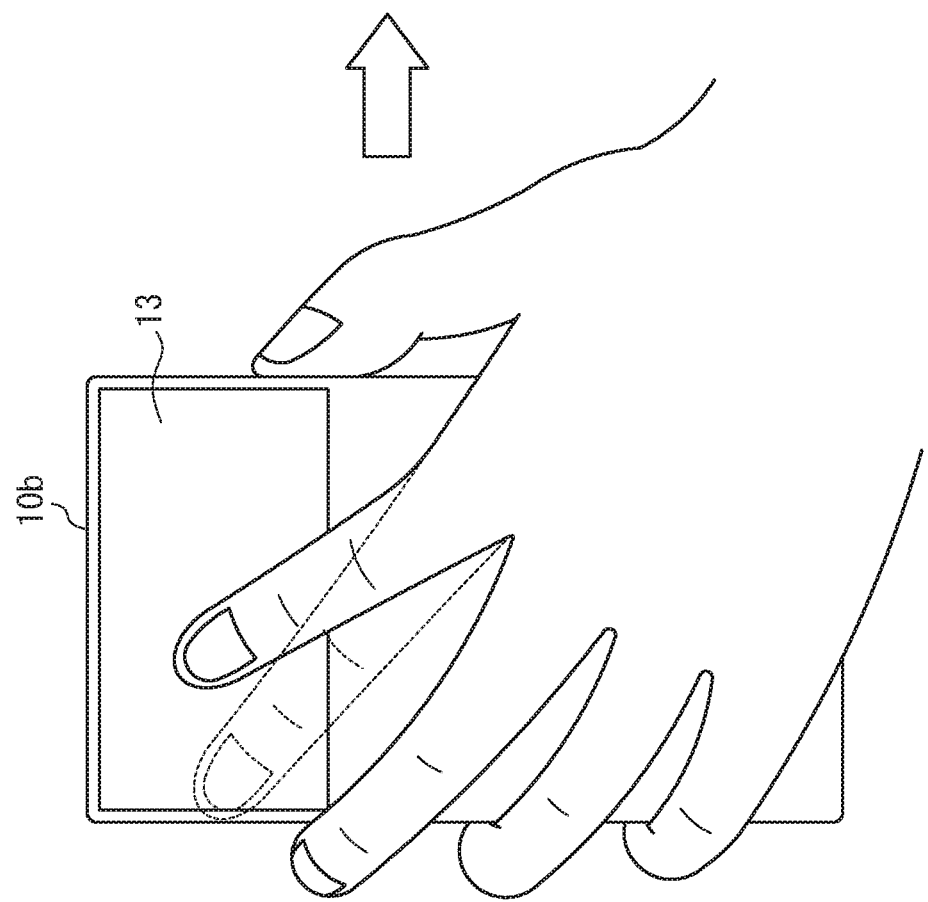

ELECTRONIC DEVICE

CROSS-REFERENCE TO RELATED APPLICATION

This application claims priority to and the benefit of Japanese Patent Application No. 2013-246403 filed Nov. 28, 2013, the entire contents of which are incorporated herein by reference.

TECHNICAL FIELD

This disclosure relates to an electronic device that includes a touch sensor on the front surface and on the back surface thereof.

BACKGROUND

In recent years, more and more electronic devices, such as mobile phones, are provided with a touch sensor that detects contact by a user. There are many known systems for detecting contact, such as a resistive film system and a capacitive system. All of these systems detect contact by a contacting object such as the user's finger or a stylus pen.

There are also electronic devices that, in addition to the front surface, also include a touch sensor on the back surface. For example, JP 2012-230567 A (PTL 1) discloses a mobile terminal that includes two touch sensors, one on the front surface and one on the back surface, and that based on a predetermined correspondence relationship associated with the usage state, accepts input to a first back surface or a second back surface as input to a first front surface or a second front surface, thereby increasing user-friendliness.

CITATION LIST

Patent Literature

PTL 1: JP 2012-230567 A

SUMMARY

Technical Problem

When operating an electronic device with one hand, it is necessary to operate objects such as icons and tabs displayed on the front surface with the thumb while holding the sides and the back surface of the electronic device with the other four fingers and the palm of the hand. The increasing screen size, however, of smartphones and other electronic devices leads to problems such as an inability to reach the screen with a finger when operating the electronic device with one hand. Some methods of operation also assume the use of two fingers, such as a pinch in/out. These operations are difficult to perform with one hand.

Therefore, it would be helpful to provide an electronic device with improved operability when operating the electronic device with one hand.

Solution to Problem

In order to resolve the aforementioned problem, an electronic device according to this disclosure includes:
a touch sensor on a front surface and a touch sensor on a back surface; and
a controller configured to set a reference point for screen processing upon detecting an operation on the touch sensor on the back surface and to execute screen processing based on the reference point and on input to the touch sensor on the front surface.

In the electronic device according to this disclosure, the controller may rescale a screen as the screen processing when detecting a slide operation with the touch sensor on the front surface.

In the electronic device according to this disclosure, the controller may rotate a screen as the screen processing when detecting a rotation operation with the touch sensor on the front surface.

The electronic device according to this disclosure may further include a pressure detector configured to detect pressure on the touch sensor on the back surface, and
the controller may set the reference point when data based on pressure detected by the pressure detector satisfies a predetermined threshold.

Advantageous Effect

According to this disclosure, operability can be improved when operating an electronic device with one hand.

BRIEF DESCRIPTION OF THE DRAWINGS

In the accompanying drawings:

FIGS. 2A, 2B, and 2C illustrate an example of a mounting structure of the electronic device according to Embodiment 1;

FIGS. 5A and 5B illustrate screen processing for rescaling according to Embodiment 1;

FIGS. 6A and 6B illustrate screen processing for rotating according to Embodiment 1;

DETAILED DESCRIPTION

The disclosed embodiments are described below in detail with reference to the accompanying drawings.

Embodiment 1

Figure 1:
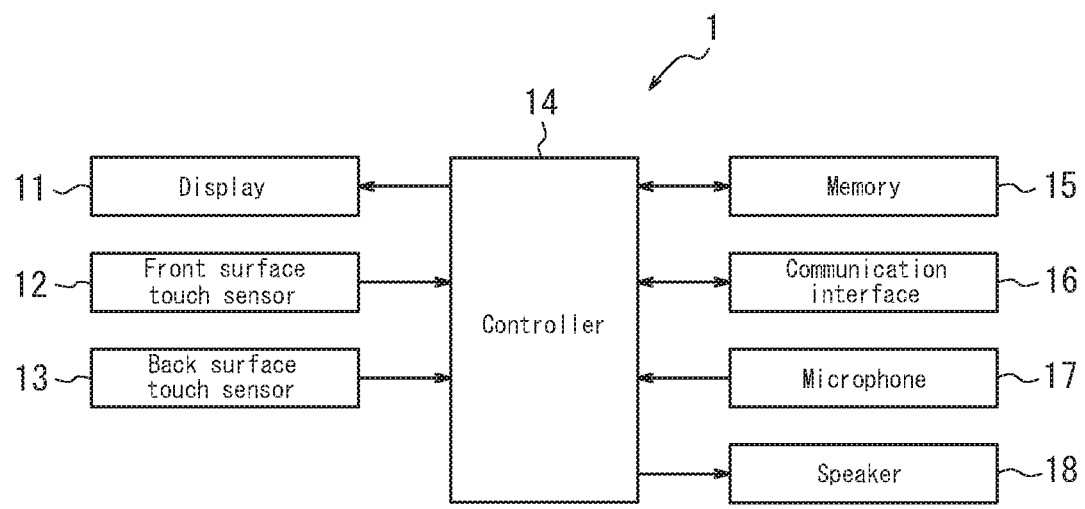
FIG. 1 is a block diagram schematically illustrating the structure of an electronic device according to Embodiment 1.

FIG. 1 is a block diagram schematically illustrating the structure of an electronic device according to Embodiment 1. In the example illustrated in FIG. 1, an electronic device 1 includes a display 11, a front surface touch sensor 12, a back surface touch sensor 13, a controller 14, a memory 15, a communication interface 16, a microphone 17, and a speaker 18.

The display 11 displays images of characters, photographs, objects for operation, and the like. The display 11 may be configured using a Liquid Crystal Display (LCD), an Organic Electroluminescence Display (OELD), or the like. For example, on a home screen, the display 11 displays objects for performing operations for a telephone call, e-mail, Internet communication, taking a photograph, and the like.

The front surface touch sensor 12 detects contact or release of contact by a finger on an input face of the front surface touch sensor 12. The front surface touch sensor 12 detects the contact position on the input face and outputs a signal indicating the detected contact position to the controller 14. The front surface touch sensor 12 is configured with a transparent member and disposed in overlap on the front surface of the display 11. The user visually confirms images on the display 11 through the transparent front surface touch sensor 12 and causes the electronic device 1 to execute predetermined processing by operating the front surface touch sensor 12 at the display position of an object for operation displayed by the display 11. An operation on the touch sensor as referred to here includes all operations to contact the finger(s) to the touch sensor, including touching, tapping, double tapping, flicking, and the like.

The back surface touch sensor 13 is disposed on the back surface of the electronic device 1 in order to improve operability when operating the electronic device 1. The back surface touch sensor 13 detects contact or release of contact by a finger on an input face of the back surface touch sensor 13 and outputs the results of detection to the controller 14. The front surface touch sensor 12 and the back surface touch sensor 13 may, for example, be implemented with a known system such as a resistive film system or a capacitive system.

Upon detecting an operation on the front surface touch sensor 12 by a signal input from the front surface touch sensor 12, the controller 14 executes control corresponding to the object for operation displayed at the contact position. In response to an operation on the front surface touch sensor 12, the controller 14 also executes screen processing to rescale the screen (zoom in/out), rotate the screen, or the like. For example, upon detecting a pinch in/out (an operation to pinch two fingers together or spread them apart) on the front surface touch sensor 12, the controller 14 executes screen processing to rescale the screen accordingly. Upon detecting a rotation operation with two fingers on the front surface touch sensor 12, the controller 14 executes screen processing to rotate the screen accordingly.

Furthermore, upon detecting an operation on the back surface touch sensor 13 by a signal input from the back surface touch sensor 13, the controller 14 sets a reference point for screen processing. After setting the reference point, the controller 14 executes screen processing based on the reference point and on input to the front surface touch sensor 12. The controller 14 may designate the reference point for screen processing to be valid for a predetermined time after being set and invalidate the reference point after the time elapses. The controller 14 may also designate the reference point to be valid while input to the back surface touch sensor 13 continues and invalidate the reference point when the finger is released and input to the back surface touch sensor 13 ends.

The memory 15 may be configured with a semiconductor memory or the like. The memory 15 stores a variety of information, programs for causing the electronic device 1 to operate, and the like and also functions as a working memory.

The communication interface 16 allows wireless communication with a base station or other communication device.

The microphone 17 picks up surrounding sound, such as speech by the user. The sound picked up by the microphone 17 is converted to an electric signal and transmitted to the controller 14.

The speaker 18 outputs sounds such as voice, music, and a ringtone.

FIGS. 2A, 2B, and 2C illustrate an example of a mounting structure of the electronic device 1 according to Embodiment 1. FIG. 2A is a front view, FIG. 2B is a cross-sectional view along the A-A line in FIG. 2A, and FIG. 2C is a back view.

In FIGS. 2A to 2C, illustration of constituent elements other than a housing 10, the display 11, the front surface touch sensor 12, the back surface touch sensor 13, and a joining member 40 is omitted. Apart from the constituent elements illustrated in FIGS. 2A to 2C, the electronic device 1 may also for example include elements such as the controller 14, a substrate, and a variety of components. Typically, the microphone 17 is disposed at the bottom of the front surface touch sensor 12, and the speaker 18 is disposed at the top of the front surface touch sensor 12.

As illustrated in FIGS. 2A to 2C, the front surface touch sensor 12 is disposed on a front surface 10a of the housing 10 (which for example is a metal or resin case) and is supported by the housing 10.

The display 11 is disposed inside the housing 10. For example, the display 11 may be adhered to the back side of the front surface touch sensor 12 and directly secured to the inside of the housing 10 or secured to a substrate, a display holder, or the like disposed inside the housing 10. In FIGS. 2A to 2C, the display 11 is adhered to the front surface touch sensor 12 with the joining member 40 therebetween. As illustrated in FIG. 2B, if the display 11 is disposed on the back side of the front surface touch sensor 12, then when the front surface touch sensor 12 and the display 11 constitute a touch panel, a user interface can freely be displayed on the display 11 and user operation can be detected by the front surface touch sensor 12. Note that the joining member 40 may be thermosetting or ultraviolet curable adhesive, double-sided tape, or the like. The joining member 40 may, for example, be optical elasticity resin, which is clear and colorless acrylic ultraviolet curing adhesive.

The back surface touch sensor 13 is disposed on a back surface 10b of the housing 10 so as to include a range that can be contacted by the index finger when the electronic device 1 is held in one hand, and the back surface touch sensor 13 is supported by the housing 10. For example, as illustrated in FIGS. 2B and 2C, the back surface touch sensor 13 is disposed on the upper portion of the back surface 10b of the housing 10.

Figure 3A:
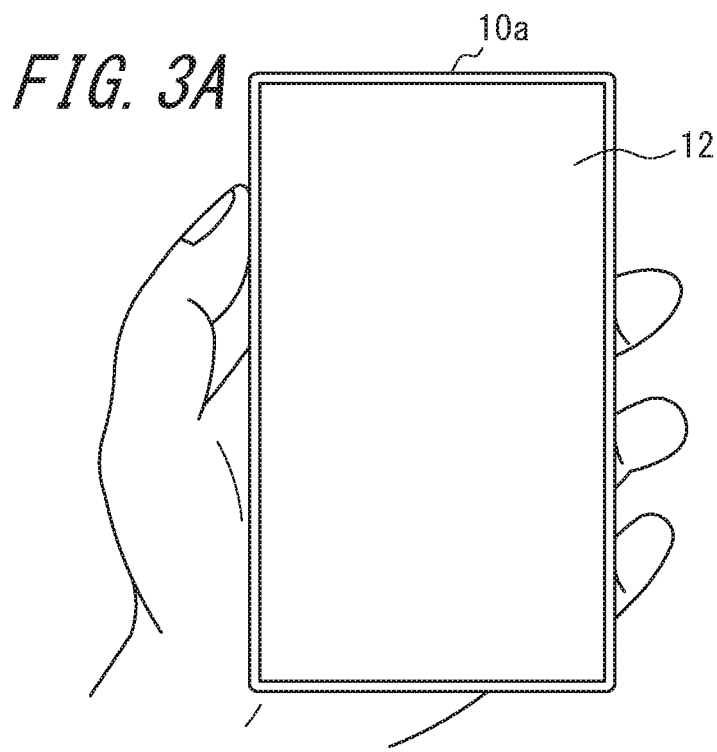
FIGS. 3A and 3B illustrate the user holding the electronic device in the left hand.
Figure 3B:
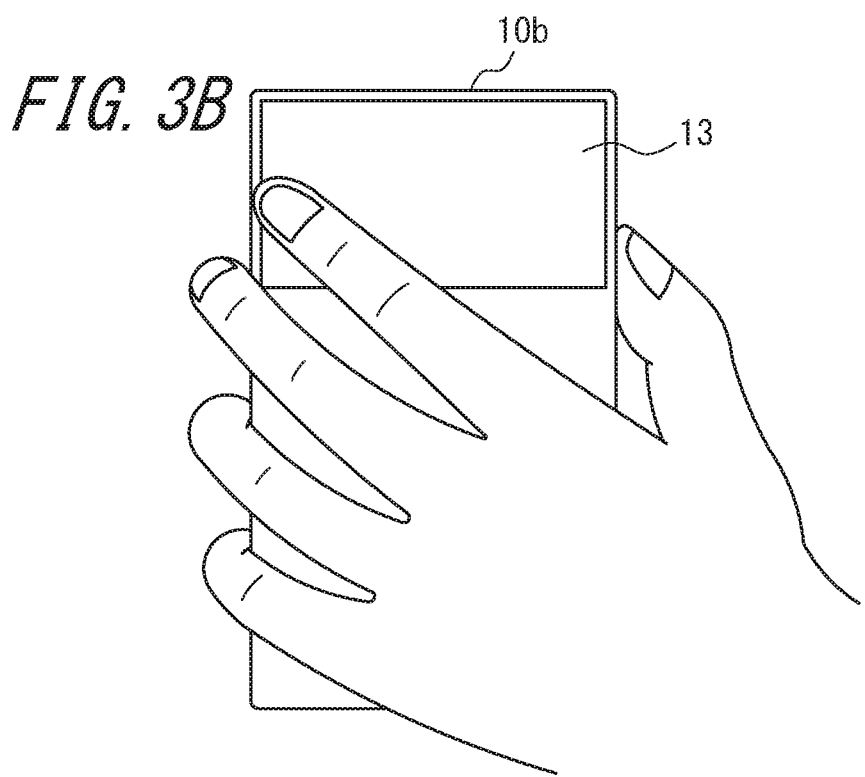

FIGS. 3A and 3B illustrate the user holding the electronic device 1 in the left hand. FIG. 3A is a view from the front surface, and FIG. 3B is a view from the back surface. As illustrated in FIG. 3B, when the electronic device 1 is held in the left hand, the index finger is positioned on the back surface touch sensor 13. Accordingly, by simply bending the index finger, the user can operate (touch, tap, double tap, flick, or the like) the back surface touch sensor 13 easily without moving the other fingers. In this embodiment, the back surface touch sensor 13 is limited to being disposed at a position that can be contacted by the index finger, but the back surface touch sensor 13 may be disposed over a wider area.

Processing by the electronic device 1 according to one of the embodiments of this disclosure is now described. The electronic device 1 improves operability when operating an electronic device with one hand. In particular, the electronic device 1 allows use of one hand to perform screen processing that normally requires operation with two fingers.

Figure 4:
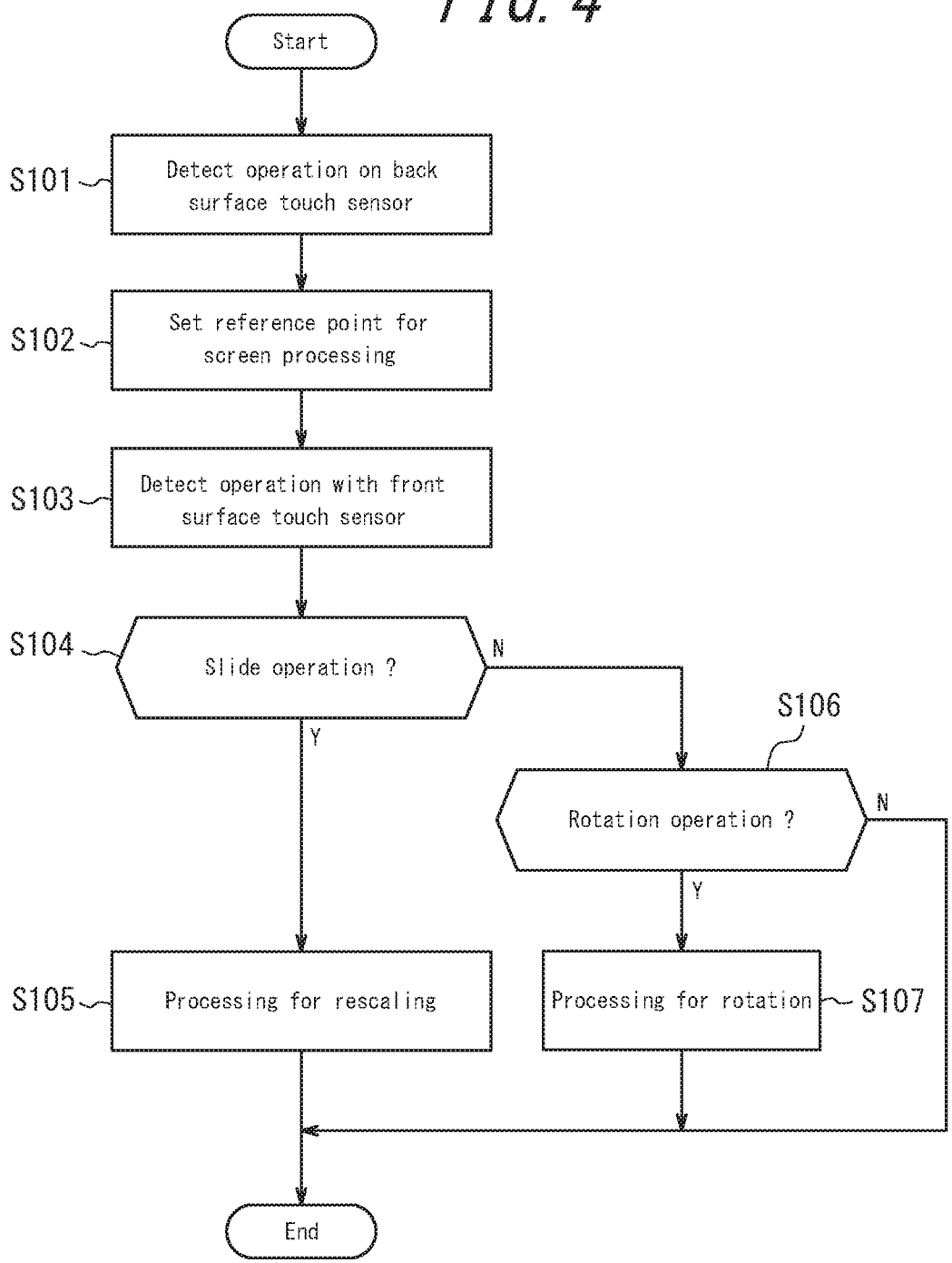
FIG. 4 is a flowchart illustrating processing by the electronic device according to Embodiment 1.

FIG. 4 is a flowchart illustrating processing by the electronic device 1 according to Embodiment 1. Upon detecting a predetermined operation (for example, a touch operation) on the back surface touch sensor 13 by a signal input from the back surface touch sensor 13 (step S101), the controller 14 sets a reference point for screen processing at a position corresponding to the contact position (step S102). The controller 14 can display the reference point on the display 11. Next, upon detecting an operation on the front surface touch sensor 12 by a signal input from the front surface touch sensor 12 (step S103), the controller 14 executes screen processing based on the input operation and on the reference point. When the operation detected in step S103 is a slide operation (step S104: Yes), the controller 14 executes screen processing to rescale an object or the entire screen in the slide direction relative to the reference point (step S105). When the operation detected in step S103 is a rotation operation (step S106: Yes), the controller 14 executes screen processing to rotate an object or the entire screen relative to the reference point (step S107).

FIGS. 5A and 5B illustrate screen processing for rescaling according to Embodiment 1. Upon detecting input to the back surface touch sensor 13 as illustrated in FIG. 5A, the controller 14 sets a reference point P for screen processing, as illustrated in FIG. 5B. The reference point P is, for example, set with the index finger. After setting the reference point P, upon detecting a slide operation on the front surface touch sensor 12, the controller 14 executes screen processing to rescale an object or the entire screen relative to the reference point P. The slide operation is, for example, performed with the thumb. As well as an operation in any direction, as in FIG. 5B, the slide operation may be defined as an operation in which the finger is moved closer to or further away from the reference point P.

FIGS. 6A and 6B illustrate screen processing for rotation according to Embodiment 1. Upon detecting input to the back surface touch sensor 13 as illustrated in FIG. 6A, the controller 14 sets a reference point P for screen processing, as illustrated in FIG. 6B. The reference point P is, for example, set with the index finger. After setting the reference point P, upon detecting a rotation operation on the front surface touch sensor 12, the controller 14 executes screen processing to rotate an object or the entire screen relative to the reference point P. The rotation operation is, for example, performed with the thumb. As well as an operation in any direction, as in FIG. 6B, the rotation operation may be defined as an operation in which the finger is moved along a circle centered on the reference point P.

In this way, according to this embodiment, the controller 14 sets the reference point for screen processing upon detecting an operation on the back surface touch sensor 13 and executes screen processing based on the reference point and on input to the front surface touch sensor 12. As a result, screen processing that assumes operation with two fingers can be performed with one hand, thereby improving usability when operating an electronic device with one hand.

When detecting a slide operation on the front surface touch sensor 12, the controller 14 rescales the screen as the screen processing relative to the reference point. As a result, rescaling of the screen, which until now required operation with two fingers such as a pinch in/out, can be performed with one hand, thereby improving usability when operating an electronic device with one hand.

When detecting a rotation operation on the front surface touch sensor 12, the controller 14 rotates the screen as the screen processing relative to the reference point. As a result, rotation of the screen, which until now required operation with two fingers, can be performed with one hand, thereby improving usability when operating an electronic device with one hand.

Embodiment 2

Figure 7:
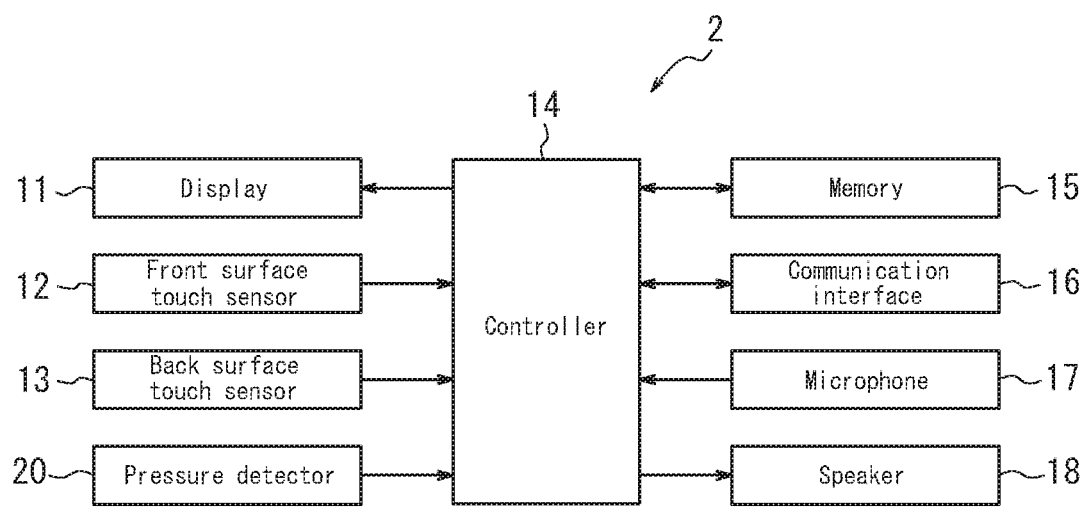
FIG. 7 is a block diagram schematically illustrating the structure of an electronic device according to Embodiment 2.

Next, Embodiment 2 is described. FIG. 7 is a block diagram schematically illustrating the structure of an electronic device according to Embodiment 2. As compared to the electronic device 1 according to Embodiment 1, an electronic device 2 according to Embodiment 2 further includes a pressure detector 20. The remaining structure is identical to that of Embodiment 1. Therefore, the same reference signs are applied, and a description thereof is omitted.

The pressure detector 20 detects pressure when the user performs an operation on the back surface touch sensor 13 and outputs data based on the pressure to the controller 14. The pressure detector 20 for example may be configured using a strain gauge sensor, a piezoelectric element, or the like that experiences a change in physical or electrical characteristics (strain, resistance, voltage, or the like) in response to pressure. When the pressure detector 20 is configured using a piezoelectric element, for example, the voltage value (data based on pressure), which is an electrical characteristic, of the piezoelectric element of the pressure detector 20 changes in accordance with the magnitude of the load (force) of the pressure on the back surface touch sensor 13 (or the speed at which the magnitude of the load changes (acceleration)). Note that instead of a voltage value, the data based on pressure may be the magnitude of the load, the power, the resistance, or the like due to pressure.

The pressure detector 20 may similarly detect pressure when the user performs an operation on the front surface touch sensor 12.

The controller 14 acquires the data based on pressure on the back surface touch sensor 13 (and the front surface touch sensor 12) from the pressure detector 20. When the data based on pressure is at least a predetermined threshold, the controller 14 judges that a predetermined operation has been performed, and in response to the content of the operation, performs control to execute predetermined processing based, for example, on an application.

Furthermore, the pressure detector 20 can be configured in accordance with the contact detection system. For example, if the contact detection system is a resistive film system, the pressure detector 20 may be configured without using a strain gauge sensor, piezoelectric element, or the like by associating the magnitude of the resistance that corresponds to the size of the contact area with the load of the pressure on the touch face of the touch sensor. Alternatively, if the touch sensor uses a capacitive type system, a configuration without a strain gauge sensor, a piezoelectric element, or the like may be adopted by associating the magnitude of the capacitance with the load of the pressure on the touch sensor.

Figure 8:
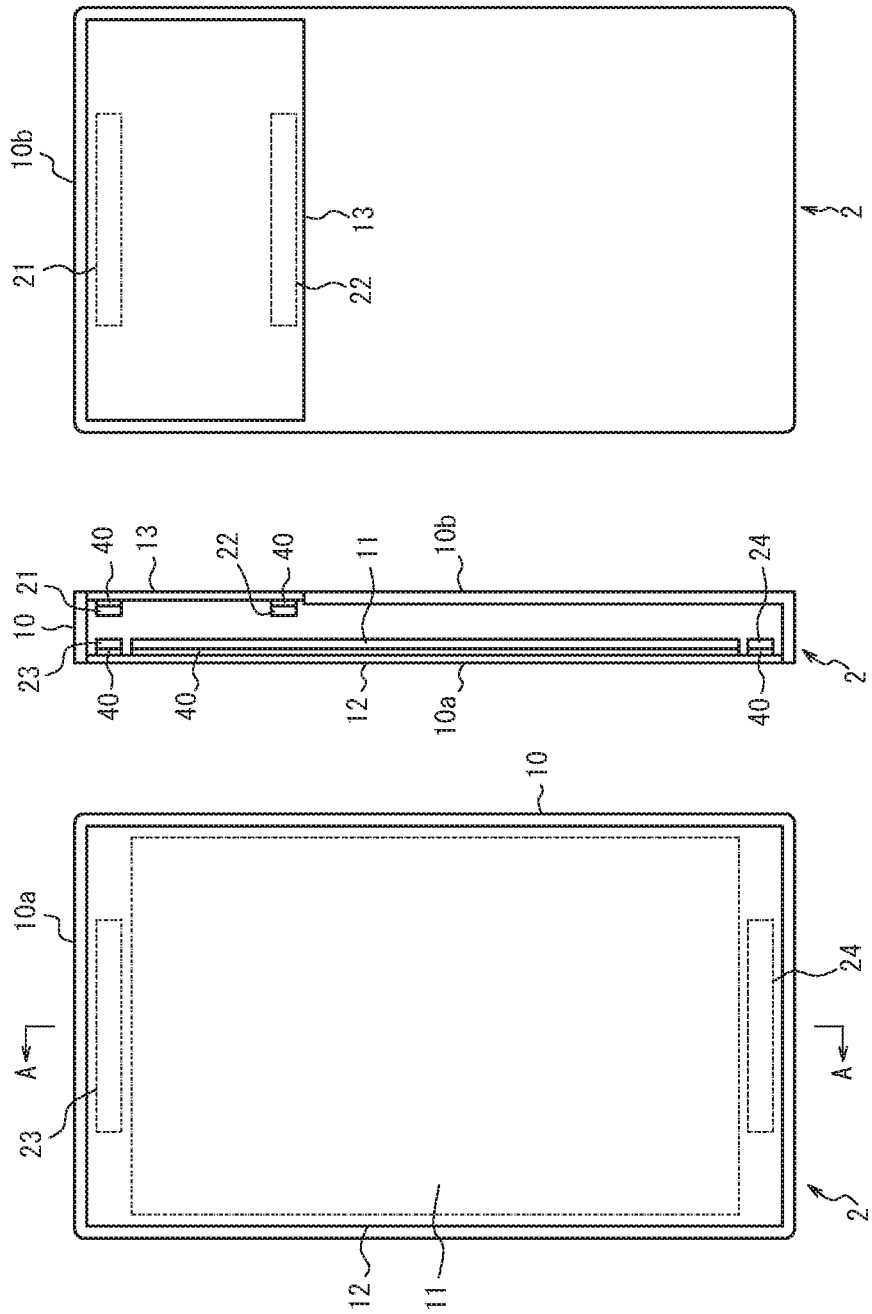
FIGS. 8A, 8B, and 8C illustrate an example of a mounting structure of the electronic device according to Embodiment 2.

FIGS. 8A, 8B, and 8C illustrate an example of a mounting structure of the electronic device 2 according to Embodiment 2. FIG. 8A is a front view, FIG. 8B is a cross-sectional view along the A-A line in FIG. 8A, and FIG. 8C is a back view. FIGS. 8A to 8C illustrate the mounting structure of the electronic device 1 in FIGS. 2A to 2C with the addition of piezoelectric elements 21 to 24 that form the pressure detector 20. The number and arrangement of the piezoelectric elements is not limited to the illustrated example.

In the example in FIGS. 8A to 8C, the pressure detector 20 includes a first piezoelectric element 21, a second piezoelectric element 22, a third piezoelectric element 23, and a fourth piezoelectric element 24, uses the first piezoelectric element 21 and the second piezoelectric element 22 to detect pressure when the user performs an operation on the back surface touch sensor 13, and uses the third piezoelectric element 23 and the fourth piezoelectric element 24 to detect pressure when the user performs an operation on the front surface touch sensor 12.

In FIG. 8A, in the area on the front surface touch sensor 12 where the display by the display 11 does not need to be visible, i.e. the area where the front surface touch sensor 12 and the display 11 do not overlap, the area near the edges of the front surface touch sensor 12 is preferably painted or covered with a bezel. The third piezoelectric element 13, fourth piezoelectric element 24, and the like can thus be prevented from being seen from the exterior of the electronic device 1.

Figure 9:
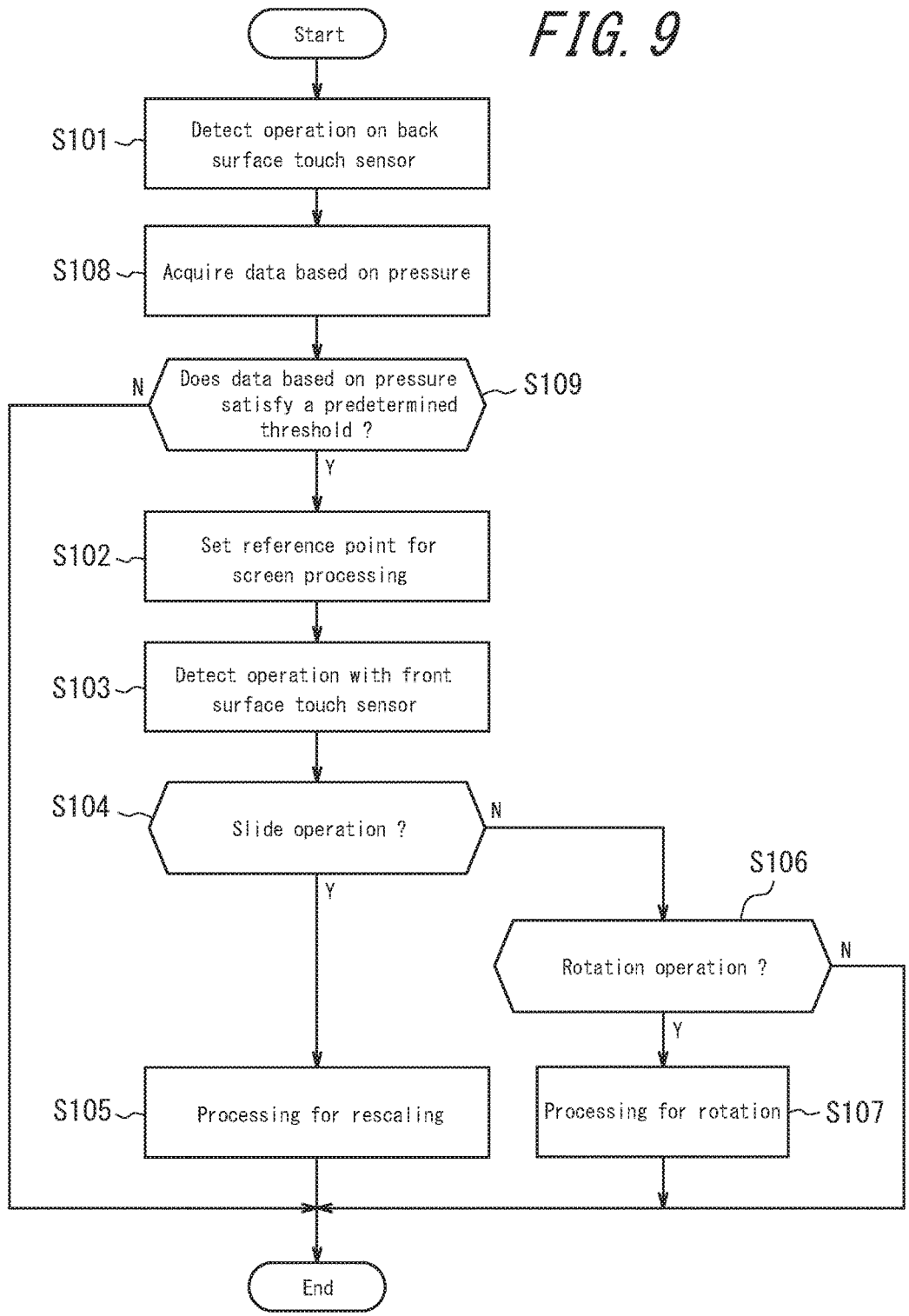
FIG. 9 is a flowchart illustrating processing by the electronic device according to Embodiment 2.

FIG. 9 is a flowchart illustrating processing by the electronic device 2 according to Embodiment 2. As compared to the flowchart for Embodiment 1 in FIG. 4, the flowchart for Embodiment 2 further includes steps S108 and S109. The remaining steps are identical to those of Embodiment 1. Therefore, the steps are labeled with the same numbers, and a description thereof is omitted.

Upon detecting a predetermined operation on the back surface touch sensor 13 by a signal input from the back surface touch sensor 13 (step S101), the controller 14 acquires data based on pressure on the back surface touch sensor 13 from the pressure detector 20 (step S108). The controller 14 then determines whether the acquired data based on pressure satisfies a predetermined threshold (step S109). When the data based on pressure satisfies a predetermined threshold (step S109: Yes), the controller 14 judges that a pressure operation was performed on the back surface touch sensor 13 and sets a reference point for screen processing at a position corresponding to the pressure position (step S102). Subsequently, as in Embodiment 1, the controller 14 executes screen processing based on the operation input to the front surface touch sensor 12 and on the reference point (steps S103 to S107).

When detecting an operation on the front surface touch sensor 12 in step S103, the controller 14 may use data based on pressure on the front surface touch sensor 12 acquired from the pressure detector 20. In other words, when data acquired from the pressure detector 20 satisfies a predetermined threshold, the controller 14 may detect an operation on the front surface touch sensor 12 as being a slide operation or a rotation operation.

In this way, the electronic device 2 according to Embodiment 2 further includes a pressure detector 20, and when data based on pressure satisfies a predetermined threshold, the controller 14 sets a reference point for screen processing. Therefore, a judgement that the user has performed an operation can be prevented when the electronic device 2 has merely contacted another object lightly. In particular, when the user holds the electronic device, the fingers contact the front and back surfaces, but by having the pressure detector 20 detect pressure, an incorrect judgement that the user has performed an operation when in fact the user had no intention of doing so can be prevented.

Embodiment 3

Figure 10:
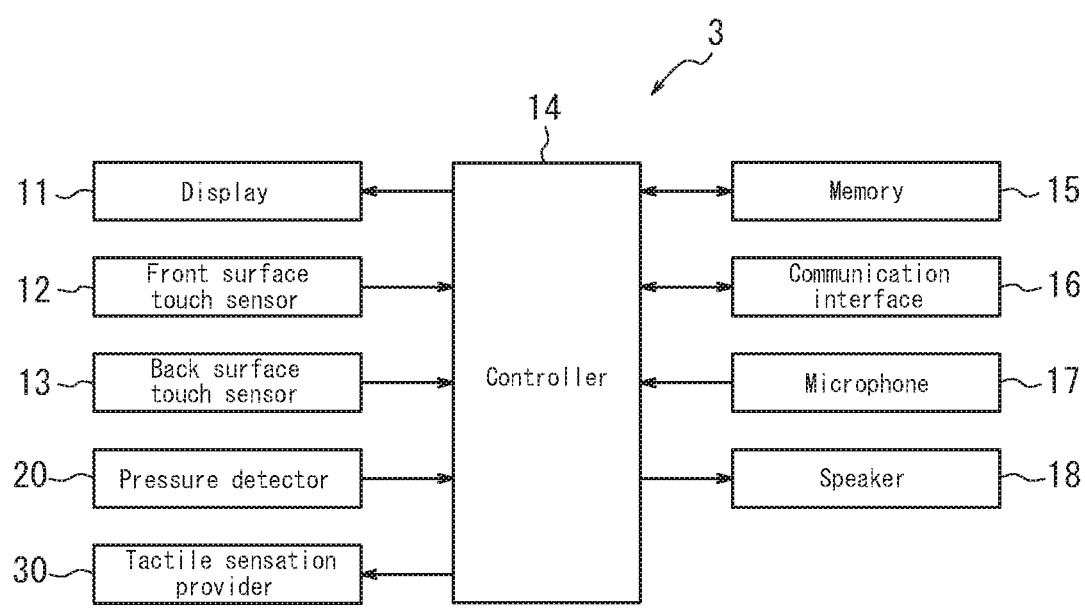
FIG. 10 is a block diagram schematically illustrating the structure of an electronic device according to Embodiment 3.

Next, Embodiment 3 is described. FIG. 10 is a block diagram schematically illustrating the structure of an electronic device according to Embodiment 3. As compared to the electronic device 2 according to Embodiment 2, an electronic device 3 according to Embodiment 3 further includes a tactile sensation provider 30. The remaining structure is identical to that of Embodiment 2. Therefore, the same reference signs are applied, and a description thereof is omitted.

The tactile sensation provider 30 generates a predetermined vibration based on a drive signal provided by the controller 14. It suffices for the drive signal to be a drive signal that expresses vibration, at the position contacted by the finger, corresponding to behavior of a real button that is to be expressed.

The tactile sensation provider 30 is configured using a piezoelectric element, an ultrasonic transducer, a vibration motor (eccentric motor), or the like, and by generating vibration with a predetermined vibration pattern, provides a tactile sensation to the user's finger pressing the back surface touch sensor 13, thereby providing the user with a sensory understanding that the back surface touch sensor 13 has been operated. Without using a mechanical vibration, the tactile sensation provider 30 may provide a tactile sensation to the user's finger pressing the back surface touch sensor 13 for example by controlling the electric charge of a film adhered onto the back surface touch sensor 13.

The tactile sensation provider 30 may also similarly generate vibration for the front surface touch sensor 12 to provide a tactile sensation to the user's finger pressing the front surface touch sensor 12.

The tactile sensation provider 30 may be configured integrally with the pressure detector 20. In particular, when the pressure detector 20 and the tactile sensation provider 30 are both configured using a piezoelectric element, they may be configured to share a common piezoelectric element. The reason is that a piezoelectric element generates voltage when pressure is applied and deforms upon application of voltage. An example of a mounting structure for this case is as illustrated in FIGS. 8A to 8C.

In the case of configuring the pressure detector 20 and the tactile sensation provider 30 with a piezoelectric element, when the voltage value of the piezoelectric element satisfies a predetermined threshold, the controller 14 may execute predetermined processing and generate vibration by driving the piezoelectric element. Stating that the voltage value of the piezoelectric element satisfies a predetermined threshold may refer to when the voltage value has reached a predetermined standard value, to when the voltage value has exceeded a predetermined standard value, or to when a voltage value equivalent to a predetermined standard value has been detected.

As described above, the electronic device 3 according to Embodiment 3 further includes the tactile sensation provider 30 and generates a predetermined vibration based on a drive signal provided by the controller 14. Therefore, when the user operates the back surface touch sensor 13 (and the front surface touch sensor 12), the electronic device 3 can provide the user with a sensory understanding that the intended operation has been performed.

The above embodiments have been described as representative examples, but it will be apparent to one of ordinary skill in the art that numerous modifications and replacements may be made within the spirit and scope of this disclosure. Therefore, this disclosure should not be interpreted as being restricted to the above-described embodiments. A variety of changes and modifications may be made without departing from the scope of the appended claims. For example, a plurality of the structural blocks described in the embodiments may be combined into one, or one structural block may be divided into multiple parts.

REFERENCE SIGNS LIST 1, 2, 3 Electronic device
11 Display

12 Front surface touch sensor
13 Back surface touch sensor
14 Controller
15 Memory
16 Communication interface
17 Microphone
18 Speaker
20 Pressure detector
21 First piezoelectric element
22 Second piezoelectric element
23 Third piezoelectric element
24 Fourth piezoelectric element
30 Tactile sensation provider
40 Joining member

The invention claimed is:

1. An electronic device, comprising:
a touch sensor on a front surface and a touch sensor on a back surface; and
a controller configured to:
  set a reference point on the front surface corresponding to a point on which an operation is detected on the back surface, designate the reference point to be valid for a predetermined time after the reference point is set; and
  when detecting a circular touch operation on the touch sensor on the front surface, execute screen processing that rotates a displayed object based on movement of an input to the touch sensor on the front surface around the reference point that is valid, wherein
the circular touch operation is a circular input to the touch sensor, and
the reference point is the point of rotation.

2. The electronic device of claim 1, wherein the controller rescales a screen as the screen processing when detecting a slide operation with the touch sensor on the front surface.

3. The electronic device of claim 1, further comprising a pressure detector configured to detect pressure on the touch sensor on the back surface, wherein
the controller sets the reference point when data based on pressure detected by the pressure detector satisfies a non-zero predetermined threshold.

4. The electronic device of claim 1, wherein the screen processing causes a single displayed object to be rotated.

* * * * *